US008944659B2

(12) United States Patent
Dabov et al.

(10) Patent No.: US 8,944,659 B2
(45) Date of Patent: Feb. 3, 2015

(54) METHODS FOR ASSEMBLING ELECTRONIC DEVICES USING EMBEDDED LIGHT GUIDE STRUCTURES

(75) Inventors: Teodor Dabov, San Francisco, CA (US); Casey J. Feinstein, San Jose, CA (US); David A. Pakula, San Francisco, CA (US); Stephen Brian Lynch, Portola Valley, CA (US)

(73) Assignee: Apple Inc., Cupertino, CA (US)

( * ) Notice: Subject to any disclaimer, the term of this patent is extended or adjusted under 35 U.S.C. 154(b) by 436 days.

(21) Appl. No.: 13/401,692

(22) Filed: Feb. 21, 2012

(65) Prior Publication Data

US 2013/0215638 A1    Aug. 22, 2013

(51) Int. Cl.
  *F21V 8/00*    (2006.01)
(52) U.S. Cl.
  CPC ............ *G02B 6/0081* (2013.01); *G02B 6/0086* (2013.01)
  USPC .......................................... 362/581; 362/632
(58) Field of Classification Search
  USPC .......................................... 362/581, 551, 632
  See application file for complete search history.

(56) References Cited

U.S. PATENT DOCUMENTS

| 6,284,086 B1 | 9/2001 | Cardellino et al. |
| 6,654,077 B1 | 11/2003 | Bul |
| 6,726,806 B2 | 4/2004 | Takemoto et al. |
| 8,029,637 B2 | 10/2011 | Kavosh et al. |
| 2005/0276566 A1 | 12/2005 | Iimura |
| 2008/0101084 A1 | 5/2008 | Hsu |
| 2011/0149605 A1* | 6/2011 | Sato .............................. 362/619 |
| 2011/0198014 A1 | 8/2011 | Mak et al. |
| 2011/0268888 A1 | 11/2011 | Middlemass et al. |
| 2011/0292623 A1 | 12/2011 | Stanley |
| 2012/0008340 A1 | 1/2012 | Tomotoshi et al. |

FOREIGN PATENT DOCUMENTS

| CN | 1285049 | 2/2001 |
| CN | 102138090 | 7/2011 |
| CN | 102236266 | 11/2011 |
| JP | S6292902 | 4/1987 |

* cited by examiner

*Primary Examiner* — Laura Tso
(74) *Attorney, Agent, or Firm* — Treyz Law Group; Kendall P. Woodruff

(57) ABSTRACT

Electronic devices may include assemblies of structures such as electronic device assemblies connected using light-cured liquid adhesive such as ultraviolet-light-cured adhesive. Light guide structures may be mounted in the assemblies. During manufacture of an electronic device, ultraviolet light may be injected into a light guide structure to cure the light-cured liquid adhesive. A light guide structure may include portions that prevent escape of ultraviolet light and portions that allow ultraviolet light to escape into the light-cured liquid adhesive. Light guide structures may include masked portions, rigid support members, and one or more openings. Openings in a light guide structure may allow the light-cured liquid adhesive to be injected into an assembly through the openings. An adhesive applicator may be used to apply the adhesive to portions of the assembly. An external light source may be used to inject light that cures the adhesive into the light guide structures.

18 Claims, 18 Drawing Sheets

METHODS FOR ASSEMBLING ELECTRONIC DEVICES USING EMBEDDED LIGHT GUIDE STRUCTURES

BACKGROUND

This relates generally to manufacturing techniques for electronic devices, and more particularly, to methods for forming assemblies using adhesive.

Adhesives are widely used in manufacturing. For example, electronic devices often include housings and structures that are attached to each other with pressure sensitive adhesive. In some situations it is difficult to use pressure sensitive adhesive to attach structures to each other. For example, if two parts must slide past each other during assembly, it may be necessary to attach the parts to each other using liquid adhesive rather than a layer of pressure sensitive adhesive. The liquid adhesive can flow during the assembly process and will not cause the two parts to bind to each other prematurely, whereas a layer of pressure sensitive adhesive might cause the two parts to become stuck before they have reached their proper positions.

A variety of liquid adhesives are available. Some glues cure chemically. For example, two-part epoxies and methyl methacrylate (MMA) adhesives cure upon mixing resin with hardener. Cyanoacrylate (CA) adhesive is activated by exposure to moisture. Other glues are cured by application of elevated temperatures. Curing mechanisms such as these often produce undesirable outgassing and can be difficult to control.

Satisfactory control and minimal outgassing can be achieved by using adhesives that are cured by application of ultraviolet (UV) light. For example, ultraviolet-light-cured (UV) epoxy can be used to attach metal and plastic parts in an electronic device. In a typical manufacturing process, uncured UV epoxy is applied to structures that are to be attached to each other. Once the structures are in their desired positions, UV light from a UV lamp is applied to the UV epoxy. This cures the UV epoxy.

In some product designs, it is awkward or impossible to expose the UV epoxy using a UV lamp. For example, if the UV epoxy is located in an interior portion of an assembly, walls or other parts of the assembly will block light from the UV lamp.

To allow UV epoxy to be used to assemble parts where the UV epoxy is located in the interior of the assembly, holes are formed in the parts. During manufacturing, a technician can insert a UV light wand into the interior portion of the assembly through the holes. The internal application of UV light using a UV wand requires the use of holes in the assembly that are large enough to accommodate the UV wand. The holes may be unsightly and may reduce the ability of the assembly to withstand environmental exposure to dust and moisture.

It would therefore be desirable to be able to provide improved techniques for assembling structures using light-sensitive adhesives.

SUMMARY

Electronic devices may include assemblies of structures that are formed using light-cured liquid adhesive such as ultraviolet-light-cured adhesive. Electronic device assemblies may include light guide structures that may guide light to internal portions of the electronic device for curing the light-cured adhesive.

The assemblies may include structures such as housing structures, displays, display layers, display cover layers, support structures, printed circuits, internal device members, subassemblies, and other structures.

The structures may be connected to each other to form an assembly within which the light guide structures are mounted. During assembly, ultraviolet-light-cured adhesive may be formed on one or more surfaces of one or more structures. Ultraviolet-light-cured adhesive may by formed around the light guide structures in the assembly or light guide structures may be inserted into ultraviolet-light-cured adhesive that has been formed on one or more structures.

A light guide structure may be implemented using optical fibers or other light guiding structures. A light guide structure may have one or more outer surfaces with portions that are configured to allow light to escape through the surface of the light guide structure and portions that are configured to prevent light from escaping through the surface of the light guide structure.

A light guide structure may include a removable portion for injecting light into the light guide structure while curing the ultraviolet-light-cured adhesive. Removable portions may be removed after curing the ultraviolet-light-cured adhesive.

A light guide structure may include one or more openings or cavities. Openings or cavities in light guide structures may allow ultraviolet-light-cured adhesive to be injected through a light guide structure mounted in an assembly into the assembly. Light such as ultraviolet light may be injected into light guiding portions of the light guide structure to cure the ultraviolet-light-cured adhesive that was injected through the openings in the light guide structure.

During assembly of an electronic device, an adhesive applicator may be used to inject ultraviolet-light-curable adhesive into an assembly. After injection of the ultraviolet-light-curable adhesive, an external light source may be coupled to a light guide in the assembly to inject light for curing the ultraviolet-light-curable adhesive into the light guide structure. After curing the ultraviolet-light-curable adhesive using the light source, the light source may be decoupled from the light guide structure and a portion of the light guide structure may remain at least partially embedded in the adhesive in the electronic device.

Further features of the invention, its nature and various advantages will be more apparent from the accompanying drawings and the following detailed description.

DETAILED DESCRIPTION

Figure 1:
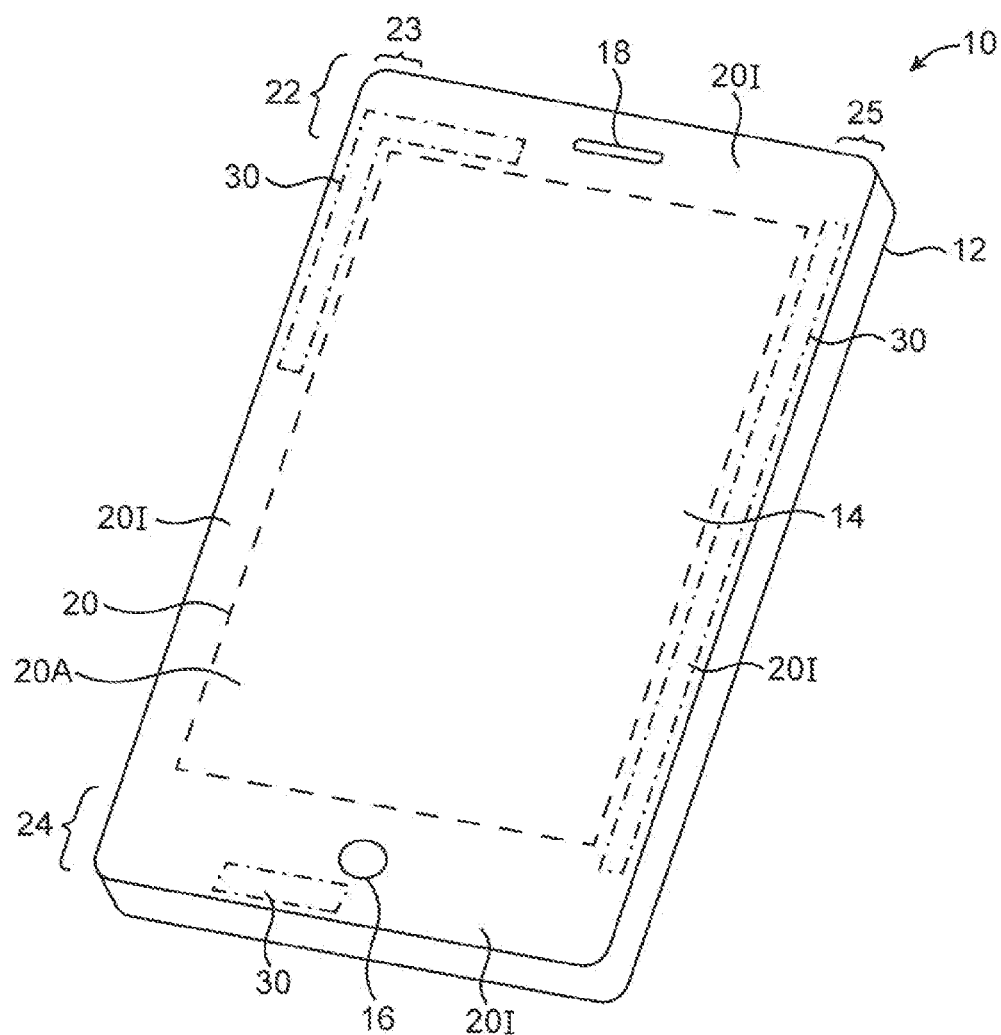
FIG. 1 is a perspective view of an illustrative electronic device with embedded light guide structures in accordance with an embodiment of the present invention.

Adhesive is widely used in connecting structures together. For example, electronic devices such as computers, cellular telephones, media players, and other electronic equipment often contains parts that are connected to each other using layers of liquid adhesive. Liquid adhesive allows parts to be moved relative to each other as part of the assembly process. For example, parts may slide with respect to each other before the adhesive has been applied or after the adhesive has been applied and before the adhesive has cured. Once the adhesive has cured, the parts become secured to one another and can be used in a finished product.

Adhesives can be activated chemically, thermally, or using light. For example, chemically activated two-part adhesives are available that have a hardener and a resin. When the hardener is mixed with the resin, a chemical reaction is created that cures the adhesive. Thermal curing typically involves raising an adhesive above room temperature. This type of curing process often produces undesirable outgassing and can be difficult to control.

As a result, adhesives are sometimes used that are cured by application of light. In a typical arrangement, ultraviolet (UV) light is applied to a UV-cured adhesive such as UV epoxy. It can be difficult or impossible to use this approach when the UV epoxy is located on the inside of an assembly. UV light wands can sometimes be inserted through holes in an assembly to reach the interior of the assembly. This allows UV light to be applied to UV adhesive within the assembly, but requires that holes be formed. The presence of the holes in parts of a device can adversely affect device aesthetics and structural integrity.

To overcome these shortcomings of conventional adhesive curing techniques, an assembly may be provided with an embedded light guide structure. Liquid adhesive may be applied to the structures that make up the assembly. Liquid adhesive may be formed between structures that make up the assembly and partially or wholly surrounding the embedded light guide structure. When the liquid adhesive and the structures that make up the assembly are in proper position, a light source may be coupled to a portion of the embedded light guide structure to inject light into the light guide structure.

The embedded light guide structure may have portions that allow the light to escape so that the light guide structure guides the light into predetermined regions of the assembly. Light that escapes from the embedded light guide structure into the adhesive can cure the adhesive from within the assembly. This may reduce or eliminate the need to from holes in the assembly to accommodate an external light source such as a UV wand. Once the adhesive has been cured, the light source can be decoupled from the embedded light guide structure.

If desired, the light guide structure may include a temporary extended removable portion for coupling to the light source. If desired, the light guide structure may include openings that allow the adhesive to be injected into the assembly through the embedded light guide structure.

An illustrative electronic device of the type that may be provided with one or more embedded light guide structures is shown in FIG. 1. Electronic device 10 may be a portable electronic device or other suitable electronic device. For example, electronic device 10 may be a laptop computer, a tablet computer, a somewhat smaller device such as a wristwatch device, pendant device, headphone device, earpiece device, or other wearable or miniature device, a cellular telephone, a media player, a gaming device, etc.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material. In other situations, housing 12 or at least some of the structures that make up housing 12 may be formed from metal elements.

Device 10 may, if desired, have a display such as display 14. Display 14 may, for example, be a touch screen that incorporates capacitive touch electrodes. Display 14 may include image pixels formed from light-emitting diodes (LEDs), organic LEDs (OLEDs), plasma cells, electronic ink elements, liquid crystal display (LCD) components, or other suitable image pixel structures. A cover glass layer may cover the surface of display 14. Portions of display 14 such as peripheral regions 201 may be inactive and may be devoid of image pixel structures. Portions of display 14 such as rectangular central portion 20A (bounded by dashed line 20) may correspond to the active part of display 14. In active display region 20A, an array of image pixels (e.g., a flexible or rigid light-emitting-diode array) may be used to display images for a user.

The cover glass layer that covers display 14 may have openings such as a circular opening for button 16 and a speaker port opening such as speaker port opening 18 (e.g., for an ear speaker for a user). Device 10 may also have other openings (e.g., openings in display 14 and/or housing 12 for accommodating volume buttons, ringer buttons, sleep buttons, and other buttons, openings for an audio jack, data port connectors, removable media slots, etc.).

Device 10 may include one or more embedded light guide structures such as light guide structures 30 (sometimes referred to herein as light pipes, fiber-optic light guides, or light guides). Light guides 30 may be located internal to device 10 along the edges of device 10, near the rear or front of device 10, as extending elements or attachable structures, or elsewhere in device 10. With one suitable arrangement, which is sometimes described herein as an example, device 10 may be provided with one or more light guide structures 30 along a first side such as left end 23 of housing 12 and one or more light guide structures 30 along an opposing second side such as right end 25 of housing 12.

As shown in FIG. 1, embedded light guide structures 30 may be formed along a single edge of device 10 or may have portions along multiple edges (e.g., perpendicular edges) of device 10. If desired, light guide structures 30 may be located in lower region 24 and upper region 22. During assembly of device 10, light guide structures 30 may be coupled to one or more components of an assembly system (e.g., adhesive delivery devices, light sources, etc.). Light may be injected into an edge or other surface of a light guide structure such as light guide structures 30 to cure liquid adhesive for forming interior assemblies of device structures such as housing structures, displays, printed circuits, batteries, support frames, and display cover layers.

The use of device housing structures and embedded light guide structures of the type shown in FIG. 1 is merely illustrative. Electronic device 10 may have the shape of a tablet computer, may be implemented using device housings with other portable shapes, or may be implemented as part of other suitable electronic equipment. Two or more light guide structures, three or more light guide structures, four or more light guide structures, or other suitable number of light guide structures may be used in device 10.

Figure 2:
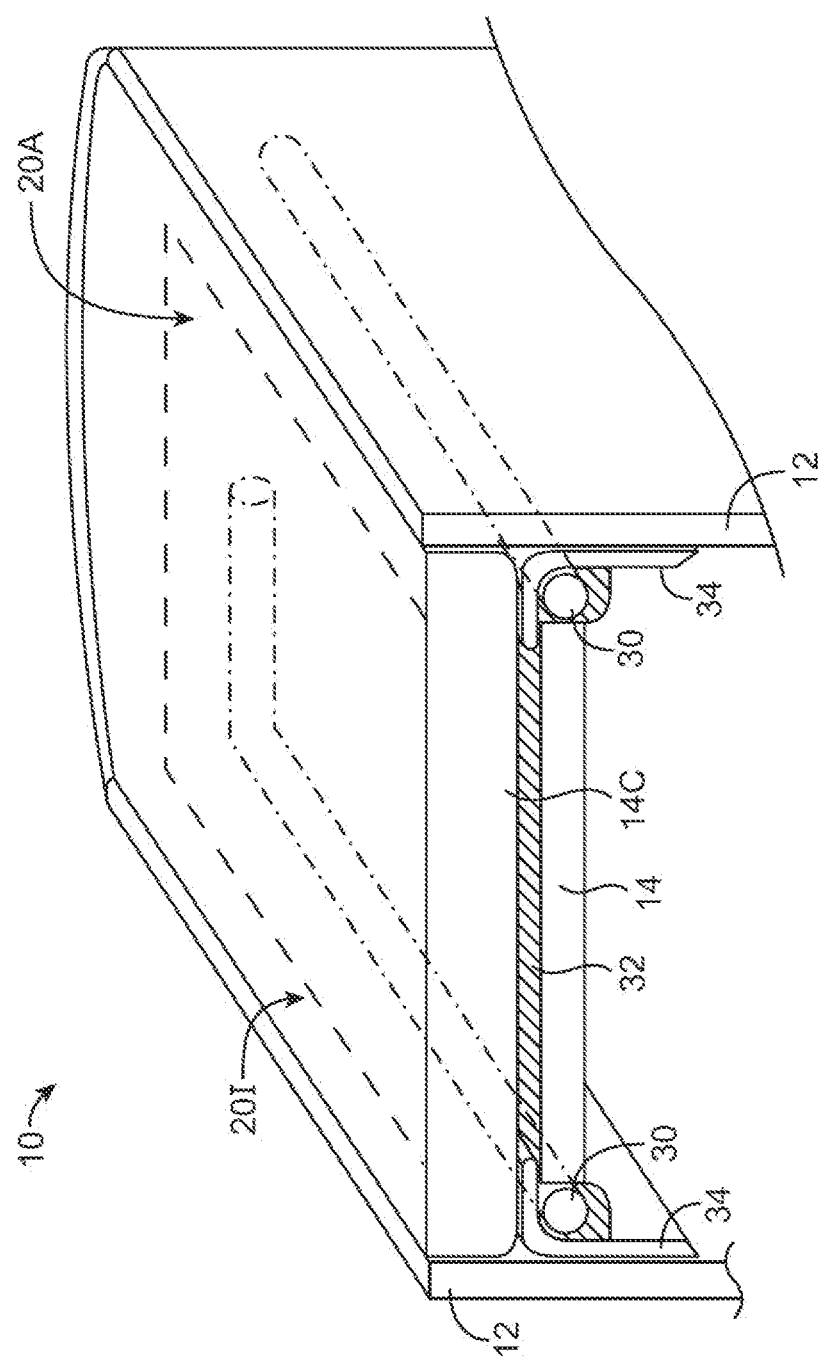
FIG. 2 is a cross-sectional perspective view of an illustrative assembly having internal components that include a light guide structure for guiding light for curing adhesive in accordance with an embodiment of the present invention.

An illustrative assembly of the type that may be provided with an embedded light guide structure for curing liquid adhesive is shown in FIG. 2. As shown in the perspective view of illustrative device 10 of FIG. 2, device 10 may contain an assembly of multiple structures such as housing structure 12, display 14, display layer 14C (e.g., a display cover glass), support structures 34 and light guides such as embedded light guide structures 30 that are secured together using a light-cured-adhesive such as ultraviolet-light-cured adhesive 32. Adhesive 32 may be a light-cured adhesive such as ultraviolet (UV) epoxy or other UV adhesive (sometimes referred to as ultraviolet-light-cured liquid adhesive, ultraviolet-light liquid adhesive, light-cured liquid adhesive, light-curable liquid adhesive, or ultraviolet liquid adhesive). UV epoxy and other UV adhesives are liquid until exposed to UV light.

In the example of FIG. 2, structures 12 and display layer 14C are structures that, when assembled, form an enclosure that surrounds internal components such as display 14. Structures 12 may, for example, be housing structures or other structures that have sidewalls. When structures such as structures 12 and display layer 14C are attached to each other, the structures 12 and display layer 14C may form a substantially enclosed internal cavity. Light guides 30 may be located within the internal cavity and may remain within the internal cavity after the adhesive has been cured. The shapes and sizes of structures 12 are merely illustrative. In general, the structures from which assembly 10 is formed may have any suitable configuration.

In general, any suitable number of structures may be assembled together using adhesive (e.g., two structures, more than two structures, three structures, more than three structures, four structures, more than four structures, etc.). The structures can be attached together to form a completed device (e.g., a product that is sold to an end user) or may be used to form a part of a device (e.g., a structure to which additional components are added before the structure is complete and ready to be sold to a user). Structures that are attached together with adhesive are sometimes referred to herein as parts, members, structures, pieces, components, housings, etc. The resulting assemblage of parts may sometimes be referred to as an assembly, a device, a product, an electronic device (e.g., a completed assembly), a structure, etc.

The structures from which assembly 10 is formed may include one or more embedded light guides such as light guides 30. During manufacturing, adhesive 32 may be applied to the structures of assembly 10. Adhesive 32 may be applied to the structures of an assembly such as assembly 10 having light guide structures 30 or light guide structures 30 may be inserted into adhesive 32 after adhesive 32 has been applied to the structures of assembly 10. An external light source may be coupled to light guide structures 30 in order to inject light into device 10 to cure the adhesive. After curing, light guides 30 may remain as part of the assembly.

Light guide structures 30 may include features such as openings, cavities, surface roughness, masking layers or other features that help in applying and curing adhesive within assembly 10. Light guide structures 30 may include surface features on one or more external surfaces of light guide structures 30 that help guide light to desired portions of assembly 10 while keeping light that may be harmful to light sensitive device components away from other portion of assembly 10. As an example, light guides structures 30 may include portions that allow light to escape and portions that prevent light from escaping as shown in FIG. 3.

Figure 3:
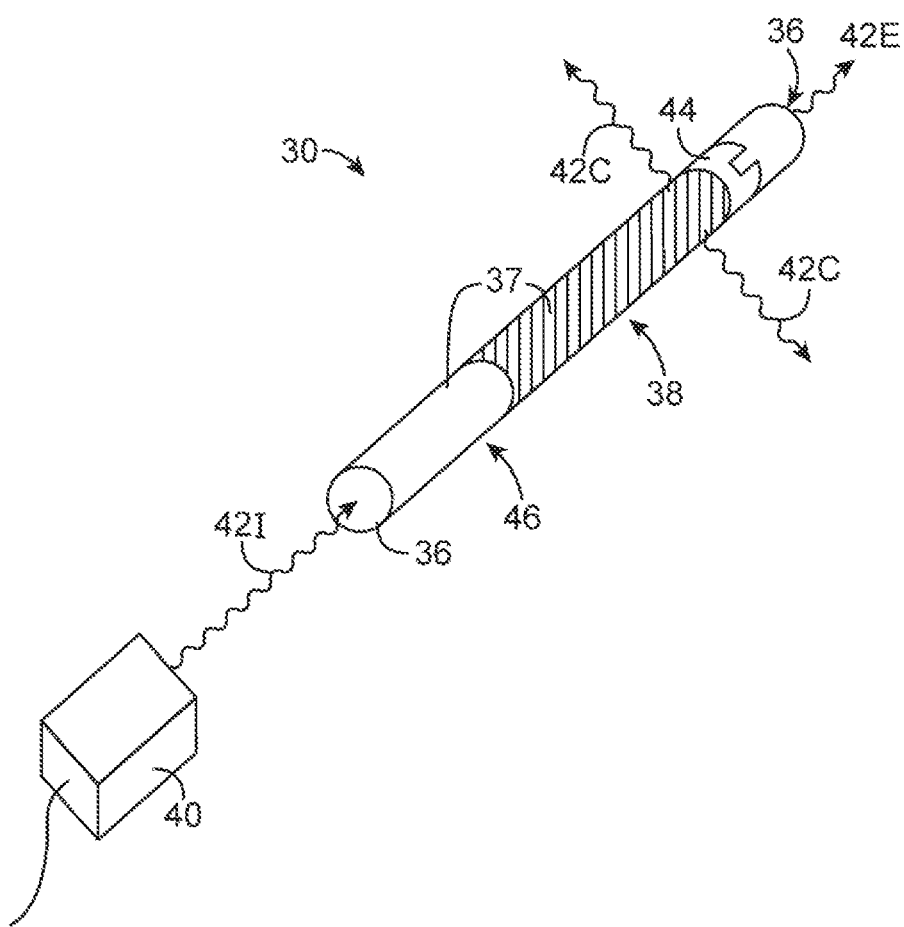
FIG. 3 is a perspective view of a portion of an illustrative light guide structure for guiding adhesive curing light having an exterior surface with portions that allow the light to escape in accordance with an embodiment of the present invention.

As shown in FIG. 3, light guide 30 may have a substantially elongated shape with an outer surface such as surface 37 and edges such as edges 36. Light guide 30 may be formed from an optical fiber that allows light to enter and exit light guide 30 from edges 36 and (based on the principle of total internal reflection) prevents light from escaping through other surfaces of light guide 30. For example, light such as incident light 42I may be injected into light guide 30 though an edge such as edge 36 using a light source such as light source 40.

Light 42I may be guided within parts of light guide 30 and a portion of light 42I such as light 42E may exit light guide 30 from an opposing end 36. Light 42I may include ultraviolet light, visible light, infrared light or other frequency of light. Exiting light 42E may exit light guide 30 in the vicinity of adhesive such as adhesive 32 of FIG. 2. In this way, light guide 30 may serve as a light pipe that helps to guide and distribute light 42I from light source 40 to adhesive 32. Upon reaching adhesive 32, light 42E may be absorbed and distributed within adhesive 32 to cure adhesive 32.

Transparent light pipe structures such as light guide 30 may be formed from transparent plastic, glass, transparent ceramics, etc. As shown in FIG. 3, surface 37 of light guide 30 may include surface features such as opaque masking layer 42 or portions such as portions 38 that allow light 42C to escape from portions 38 of surface 37. Portion 38 may be formed from a material that is different from other portions such as portion 46 of light guide 30. Portions 46 and portions 38 may be formed from materials having different refractive indices. Portion 46 may be formed from a fiber optic material that prevents light from escaping through surface 37. However, this is merely illustrative.

If desired, portion 38 and portion 46 may be formed from a common material. In configurations in which portions 38 and portions 46 are formed from the same material, surface 37 may have a surface roughness in portions 38 that is different from the surface roughness of surface 37 in portions 46. Surface roughness on surface 37 of portion 38 may help match a refractive index of surface 37 in portion 38 with a refractive index of adhesive 32. Providing light guide 30 with portions 38 having a refractive index that is matched to the refractive index of adhesive 32 may allow light 42C to escape from light guide 30 through surface 37 into adhesive 32. Upon reaching adhesive 32, light 42C may be absorbed and distributed within adhesive 32 to cure adhesive 32.

Opaque masking layers such as layer 44 may be formed in fiber optic portions such as portion 46 or in light escape portions such as portion 38 of light guide 30. Opaque masking layer 44 may be formed from black ink, silver ink, black plastic, aluminum, or other opaque masking material. Opaque masking layer 44 may help prevent light from escaping from portions of light guide 30 in the vicinity of light sensitive components of device 10.

Figure 4A:
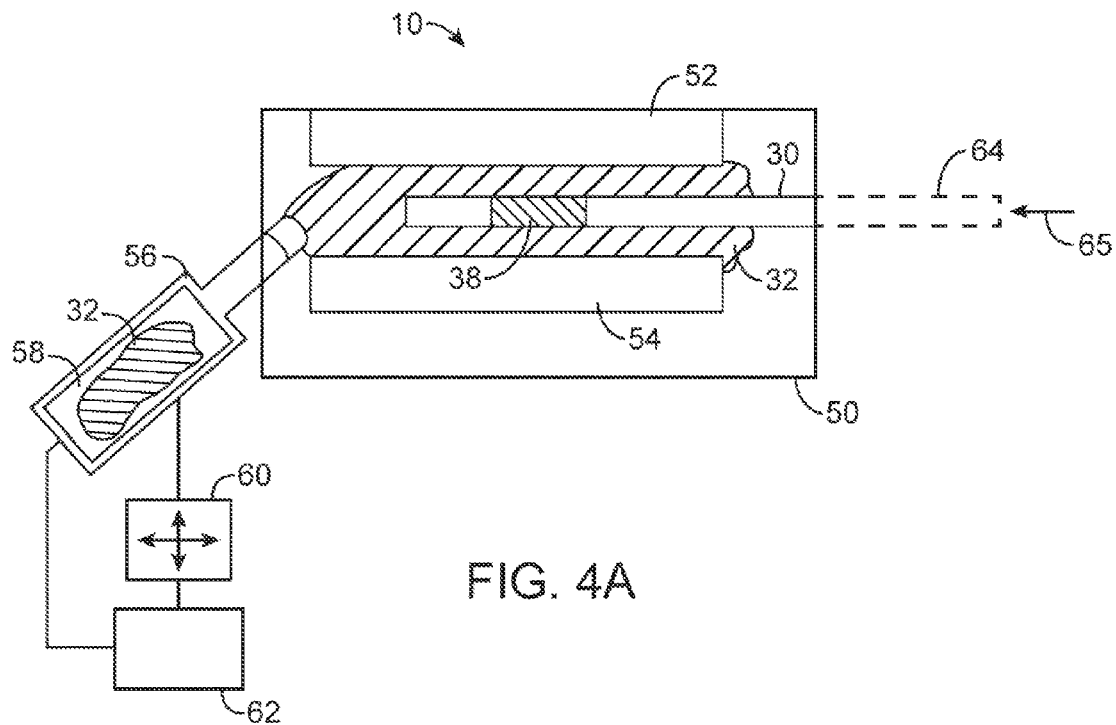
FIG. 4A is a cross-sectional side view of an illustrative assembly of the type shown in FIG. 2 showing how an adhesive delivery device may be used to form adhesive in the assembly in accordance with an embodiment of the present invention.
Figure 4B:
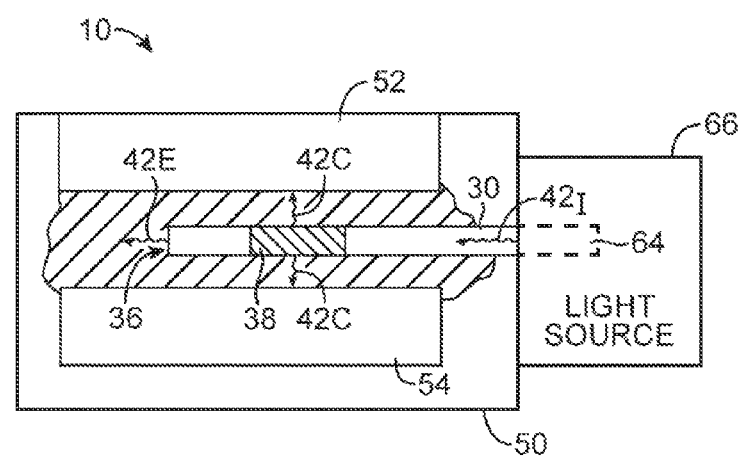
FIG. 4B is a cross-sectional side view of a light source connected to an assembly showing how an external light source may inject light into a light guide structure within the assembly that cures adhesive within the assembly in accordance with an embodiment of the present invention.
Figure 4C:
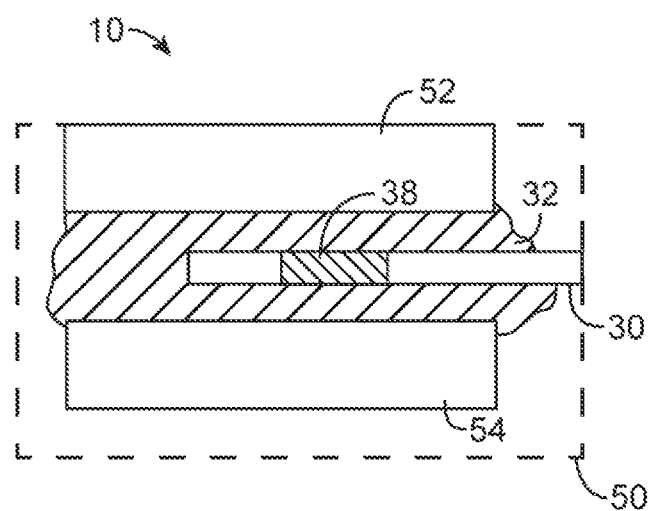
FIG. 4C is a cross-sectional side view of an illustrative assembly of the type shown in FIG. 4A showing how a light guide structure may remain in the assembly after curing of an adhesive in the assembly and after removal of a light source in accordance with an embodiment of the present invention.

Light guide 30 may be formed as an integral member of an assembly during manufacturing of device 10 as shown in FIGS. 4A, 4B, and 4C. As shown in FIG. 4A, a mechanical housing such as housing 50 may be used to hold structures such as components 52 and 54 during manufacturing of assembly 10. Housing 50 may be a portion of housing 12 of a device 10 (see FIG. 1) or may be a temporary mechanical housing that is used during assembly of device 10. Components 52 and 54 may include a display such as display 14, a display cover glass such as display layer 14C, an internal frame such as frame 34, a battery or other component associated with device 10 (see, e.g., FIG. 2).

As shown in FIG. 4A, adhesive 32 may be applied to components 52, 54 and light guide 30 using an adhesive delivery device such as adhesive applicator 56. Adhesive applicator 56 may include a reservoir such as reservoir 58 of adhesive 32. Applicator 56 may be connected to a robotic positioning table such as positioning mechanism 60 for automatically moving applicator 56 into position for applying adhesive 32 to assembly 10. Positioning mechanism 60 may be controlled by computing equipment such as control computer 62. Control computer 62 may include processing circuitry configured to drive motors associated with positioning mechanism 60 for applying adhesive 32 with applicator 56.

Adhesive 32 may be injected into a space between components such as components 52 and 54 surrounding a light guide such as light guide 30. However, this is merely illustrative. If desired, adhesive 32 may be applied in a space between components 52 and 54 followed by insertion of light guide 30 into adhesive 32 (as indicated by arrow 65). Light guide 30 may be provided with a temporary extended portion for injection of light such as removable portion 64. Removable portion 64 may extend from mechanical housing 50 to allow attachment of a light delivery source such as light source 66 as shown in FIG. 4B.

In the example of FIG. 4B, light source 66 may be coupled to light guide 30 using removable portion 64. This is merely illustrative. If desired, light source 66 may be coupled directly to permanent portions of light guide 30. Light source 66 may be based on one or more light-emitting diodes (LEDs), one or more lamps, etc. For example, the light source may include one or more UV LEDs.

As shown in FIG. 4B, light source 66 may be configured to generate (e.g., ultraviolet) light 42I to be injected into a light guide such as light guide 30 that is at least partially embedded in a light curable adhesive such as adhesive 32. Light guide 30 may be configured to guide light 42I into adhesive 32. Portions of light 42I such as light 42E may exit light guide 30 from an end such as end 36. Portions of light 42I may escape through light escape portions such as portion 38 of surface 37 of light guide 30. Upon reaching adhesive 32, light 42E and light 42C may be absorbed and distributed within adhesive 32 to cure adhesive 32.

Following curing of adhesive 32, light source 66 may be removed from light guide 30. In configurations in which light guide 30 is provided with a removable portion 64, removable portion 64 may be removed following curing of adhesive 32 with light from light source 66. As shown in FIG. 4C, assembly 10 may be provided with an embedded internal light guide structure such as light guide 30 embedded in cured adhesive 32. Mechanical housing 50 may remain coupled to components such as component 52 and form a portion of a device housing such as housing 12 (see FIG. 1) or an assembly 10 including components 52 and 54 and light guide 30 may be removed from mechanical housing structure 50 an inserted into a device housing such as housing 12.

Figure 5:
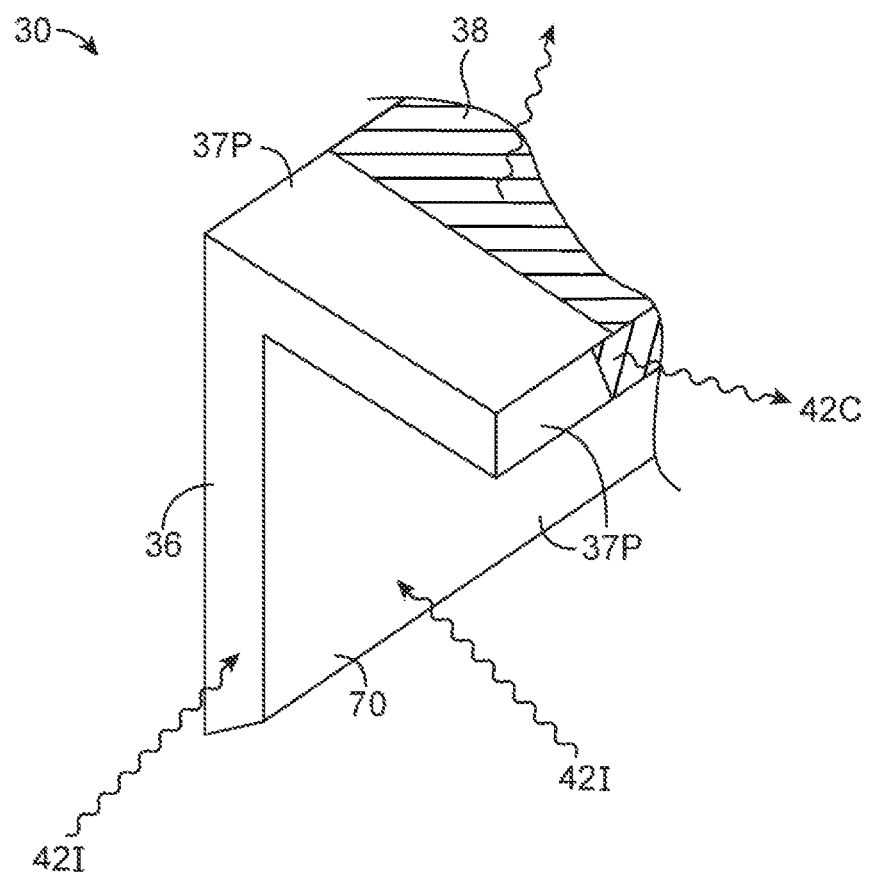
FIG. 5 is a perspective view of a light guide structure having a non-circular profile in accordance with an embodiment of the present invention.

The configurations of FIGS. 2, 3, 4A, 4B, and 4C in which light guide 30 has a substantially cylindrical shape are merely illustrative. Light guide structure 30 may have an elongated shape with substantially planar exterior surfaces, or may have other shapes. As shown in FIG. 5, light guide 30 may have an edge 36 having an L-shaped profile and an exterior surface 37 having one or more planar surfaces 37P. Planar surfaces 37P may include portions such as portion 70 for injecting incident light 42I and portions 38 from which light 42C may escape from light guide 30 into adhesive such as adhesive 32. Incident light 42I may be injected into edge 36, into portion 70 of planar surface 37P, or into both edge 36 and portion 70.

Figure 6:
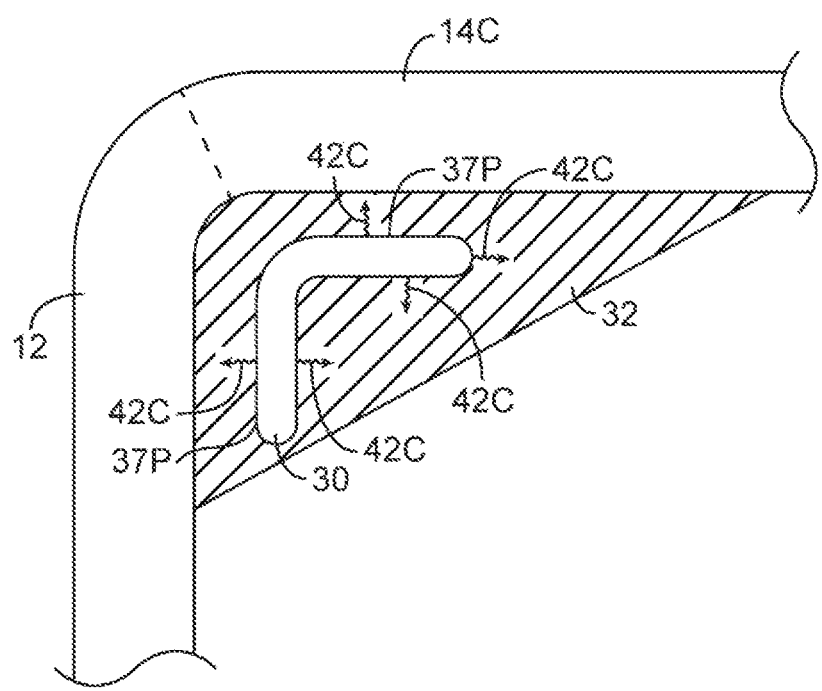
FIG. 6 is a cross-sectional side view of an illustrative assembly of the type shown in FIG. 2 having a light guide structure with a non-circular profile in accordance with an embodiment of the present invention.

As shown in FIG. 6, light 42C may escape from one or more planar surfaces 37P of light guide 30 into adhesive 32. Providing light guide 30 with an L-shaped edge profile as in the example of FIG. 6 may allow light guide 30 to conform to corners or corner joints such as the junction of a device housing 12 and a display cover glass layer such as layer 14C. After curing of adhesive 32, light guide 30 having an L-shaped edge profile may be fully embedded in adhesive 32. However, this is merely illustrative.

Figure 7:
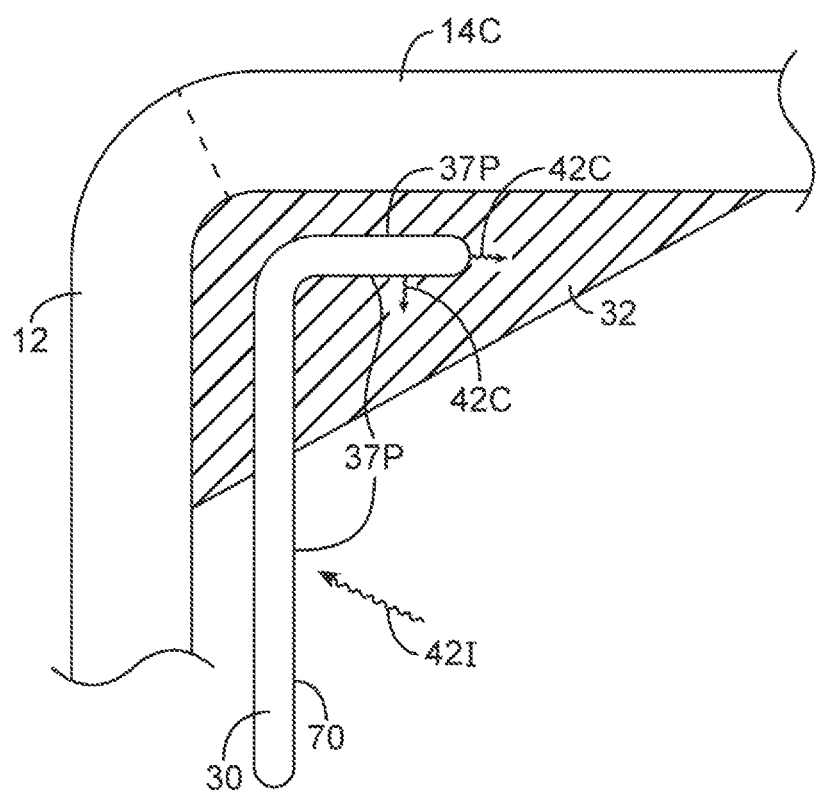
FIG. 7 is a cross-sectional side view of an illustrative assembly of the type shown in FIG. 2 having a light guide structure with a non-circular profile and a portion for light injection that extends beyond an adhesive in accordance with an embodiment of the present invention.

If desired, a portion such as portion 70 may extend beyond adhesive 32 as shown in FIG. 7. Portion 70 may extend beyond adhesive 32 so that light 42I may be injected into light guide 30 though a planar surface such as planar surface 37P.

Figure 8:
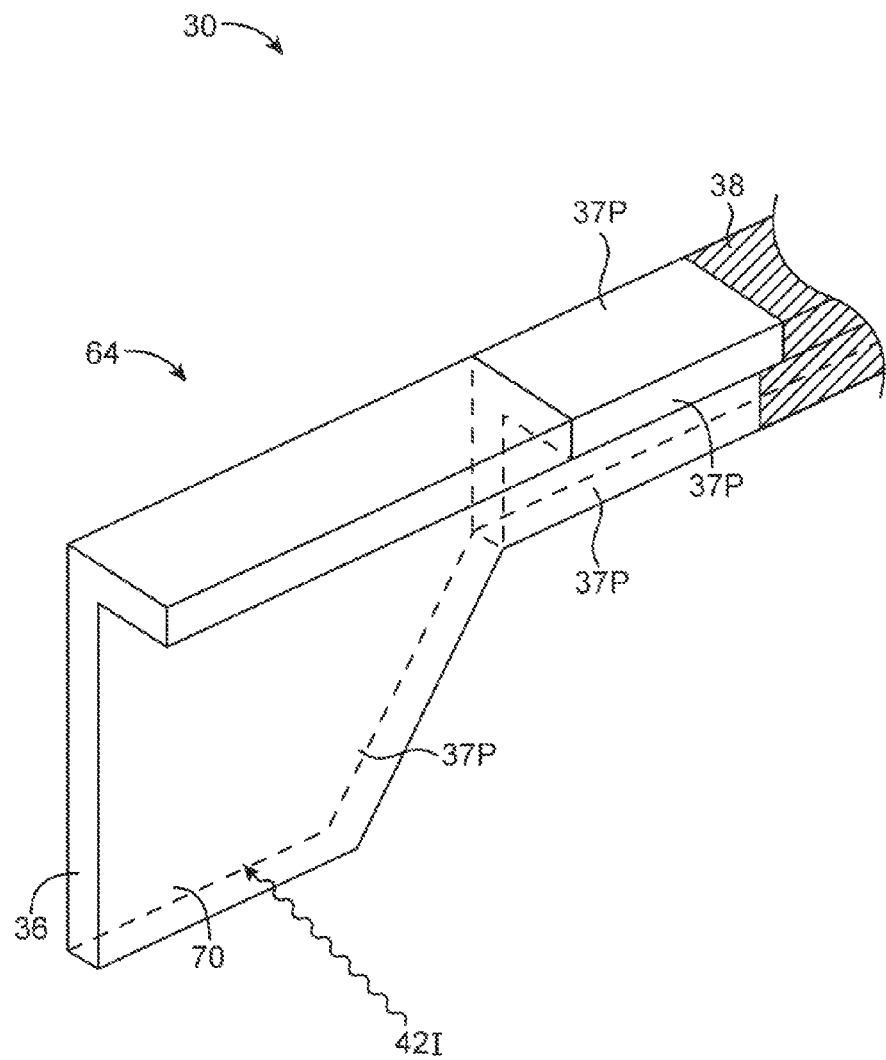
FIG. 8 is a perspective view of a light guide structure having a temporary light injection structure in accordance with an embodiment of the present invention.

As shown in FIG. 8, a light guide having an L-shaped edge profile may be provided with a temporary extended portion such as removable portion 64 having an edge 36 with an L-shaped profile. Removable portion 64 may allow attachment of a light delivery source such as light source 66 as shown in FIG. 4B. Removable portion 64 may have planar surfaces 37P such as portion 70 for injection of incident light 42I. Incident light 42I may be injected into edge 36 or portion 70 of removable portion 64 and guided in to light guide 30. Light guide 30 may guide portions of incident light 42I and portions of light 42I may escape from planar surfaces 37P of light guide 30 in portions 38 of light guide 30.

Figure 9:
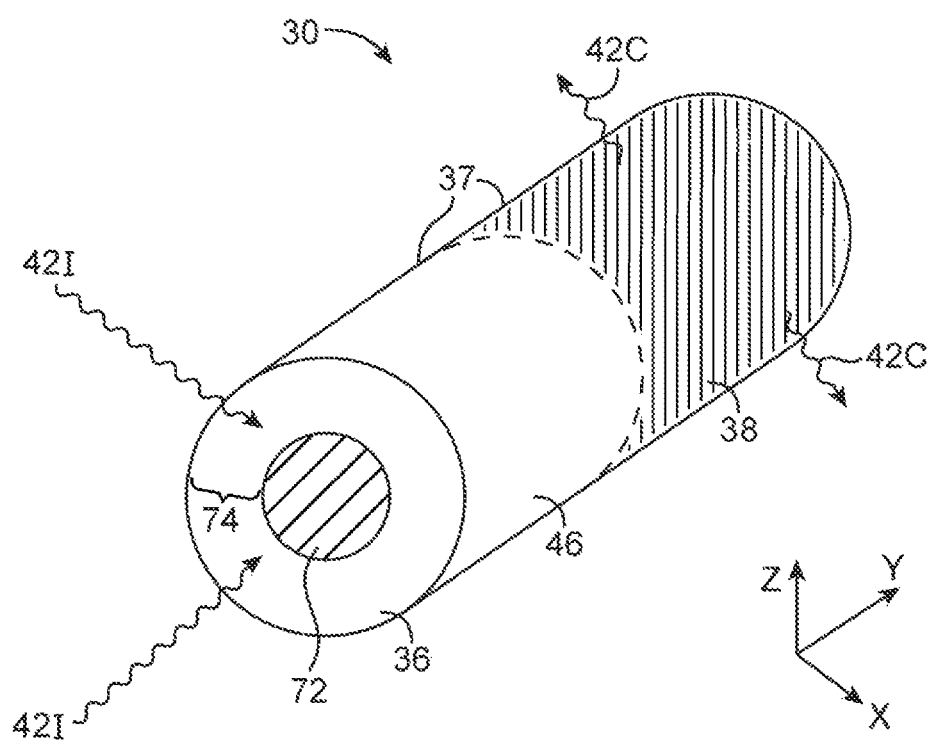
FIG. 9 is a perspective view of a light guide structure having an internal support structure in accordance with an embodiment of the present invention.

FIG. 9 shows a perspective view of a portion of a light guide 30 having a rigid support member such a support member 72. Rigid support member 72 may be a cylindrical support member that runs along an extended dimension of light guide 30 parallel to the y-axis of FIG. 9 or may have other shapes. Rigid support member 72 may be formed from plastic, metal, composites, ceramics, or other suitable rigid materials.

Light guide 30 may include a rigid support member such as support member 72 and a light guiding structure formed from light guide material formed around support member 72. Light guide material 74 may be formed from glass, plastic or other transparent or fiber optic material capable of guiding incident light such as light 42I that is incident on an edge 36 of structure 74 into interior portions of an assembly. Structure 74 of light guide 30 may include an outer surface 37 having portions 46 that prevent light from escaping (e.g., due to total internal reflection of light) and portions 38 (e.g., portions with relatively greater surface roughness) that allow light such as light 42C to escape from light guide 30 into adhesive such as adhesive 32.

Figure 10:
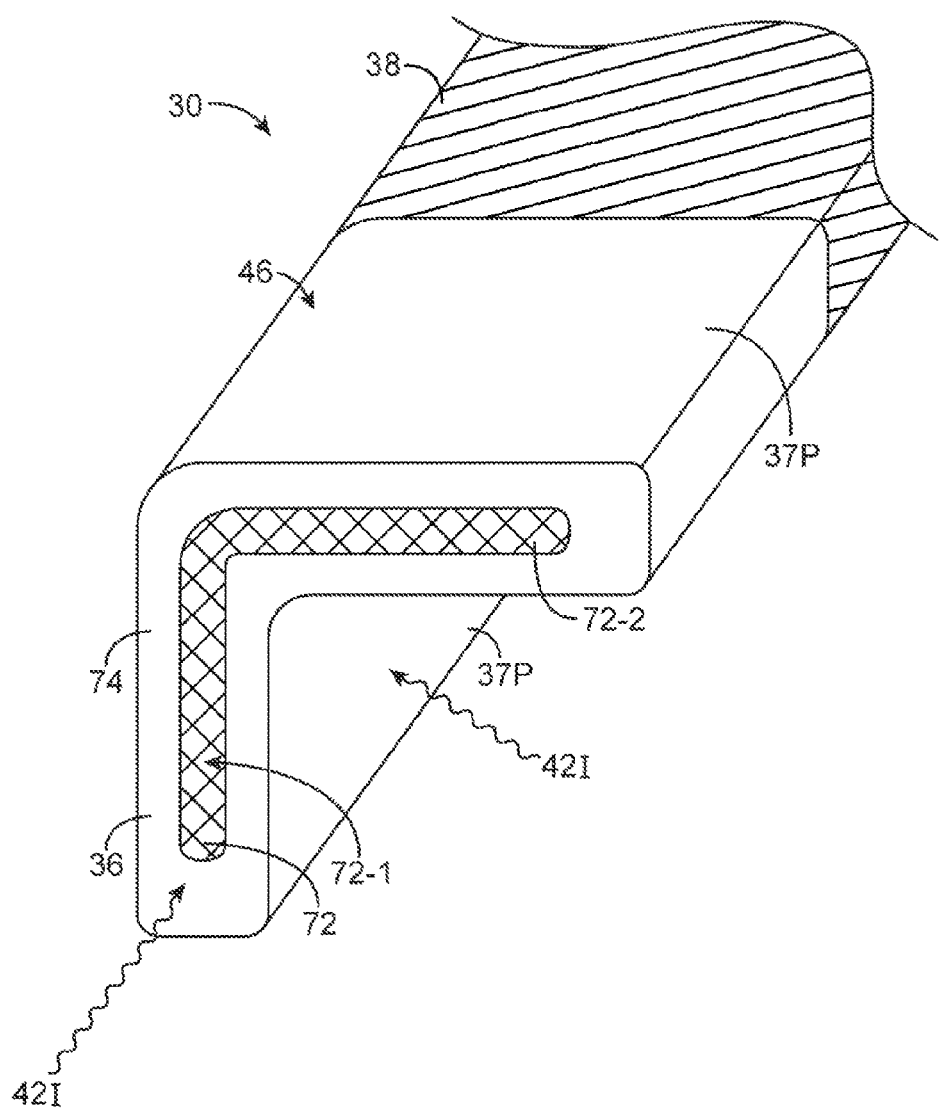
FIG. 10 is a perspective view of a light guide structure having an internal support structure and a non-circular profile in accordance with an embodiment of the present invention.

As shown in FIG. 10, an internal rigid support member such as member 72 may have a first portion 72-1 that is substantially perpendicular to a second portion 72-2. An embedded light guide such as light guide 30 having an internal rigid support member 72 with perpendicular portions 71-1 and 72-1 may have a light guide structure such as structure 74 formed around rigid support member 72.

Structure 74 may be formed from glass, plastic or other transparent material capable of guiding incident light such as light 42I that is incident on an edge 36 or planar surface 37P of structure 74 into interior portions of an assembly. Structure 74 of light guide 30 may include an outer surface 37. Surface 37 may include planar outer surfaces 37P. Surfaces 37P may include portions 46 that prevent light from escaping (e.g., due to total internal reflection of light) and portions 38 (e.g., portions with relatively greater surface roughness) that allow light such as light 42C to escape from light guide 30 into adhesive such as adhesive 32.

Figure 11:
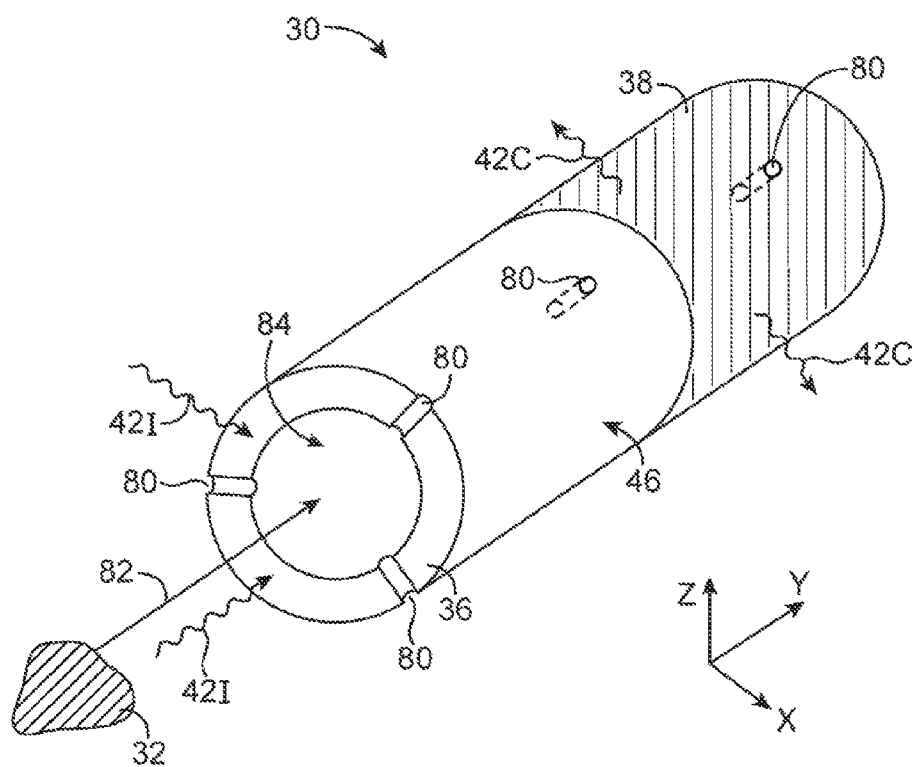
FIG. 11 is a perspective view of a light guide structure having openings for adhesive delivery in accordance with an embodiment of the present invention.

As shown in FIG. 11, light guide 30 may include one or more openings such as openings 80 and opening 84. Opening 84 may include an opening in edge 36 of light guide 30 that runs along the length of light guide 30. Adhesive 32 may be injected into opening 84 of light guide 30 as indicated by arrow 82 during manufacturing of device 10. Openings 80 in surface 37 of light guide 30 may extend into contact with opening 84. Openings 80 may be configured to allow liquid adhesive 32 that is injected into opening 84 of light guide 30 to flow through openings 80 and into portions of an assembly such as assembly 10. In this way, adhesive may be formed around light guide 30 and among components of an assembly by injecting adhesive into opening 80 of a light guide 30 that forms a portion of the assembly as shown in FIGS. 12A, 12B, and 12C.

Figure 12A:
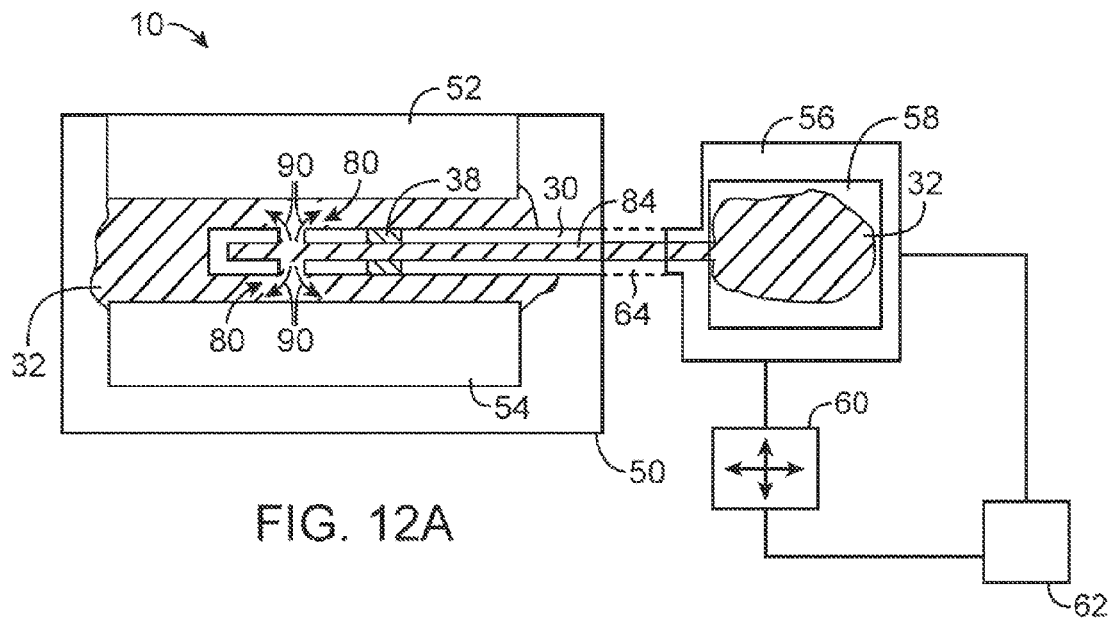
FIG. 12A is a cross-sectional side view of an illustrative assembly of the type shown in FIG. 2 showing how an adhesive delivery device may be used to inject adhesive into the assembly through a light guide structure in accordance with an embodiment of the present invention.
Figure 12B:
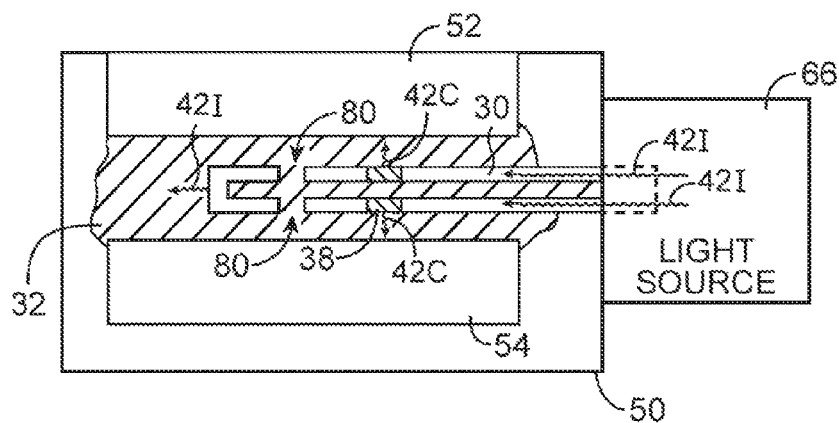
FIG. 12B is a cross-sectional side view of a light source connected to an assembly showing how a light source may inject light into a light guide structure of the type shown in FIG. 12A to cure an adhesive within the assembly in accordance with an embodiment of the present invention.
Figure 12C:
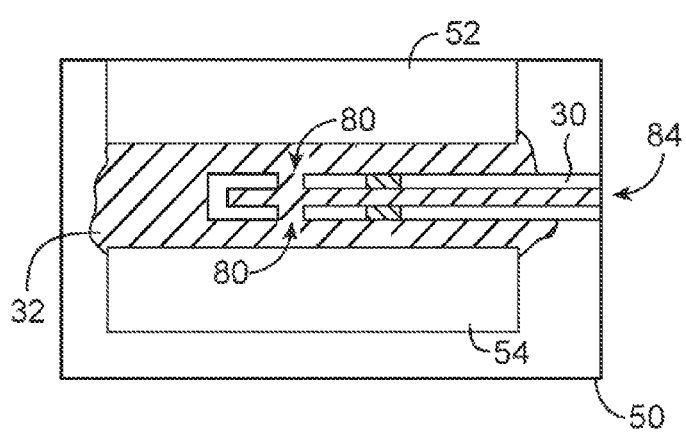
FIG. 12C is a cross-sectional side view of an illustrative assembly of the type shown in FIG. 12A showing how a light guide structure may remain in the assembly after curing of an adhesive in the assembly and after removal of a light source in accordance with an embodiment of the present invention.

As shown in FIG. 12A, during manufacturing of device 10, a mechanical housing such as housing 50 may be used to hold structures such as components 52 and 54 during manufacture of assembly 10. Housing 50 may be a portion of housing 12 of a device 10 (see FIG. 1) or may be a temporary mechanical housing that is used during assembly of device 10. Components 52 and 54 may include a display such as display 14, a display cover glass such as display layer 14C, an internal frame such as frame 34, a battery or other component associated with device 10 (see, e.g., FIG. 2).

As shown in FIG. 12A, adhesive 32 may be applied to components 52, 54 and light guide 30 using an adhesive delivery device such as adhesive applicator 56. Adhesive applicator 56 may include a reservoir such as reservoir 58 of adhesive 32. Applicator 56 may be connected to a robotic positioning table such as positioning mechanism 60 for automatically moving applicator 56 into position for applying adhesive 32 to assembly 10. Positioning mechanism 60 may be controlled by computing equipment such as control computer 62. Control computer 62 may include processing circuitry configured to drive motors associated with positioning mechanism 60 for applying adhesive 32 with applicator 56.

Adhesive 32 may be injected into an opening such as opening 84 in light guide 30. Adhesive 32 may flow (as indicated by arrows 90) into assembly 10 through openings 80 in light guide 30. Adhesive 32 may flow from openings 80 and substantially fill a space between components such as components 52 and 54 an at least partially surrounding a light guide such as light guide 30. Light guide 30 may be provided with a temporary section such as removable portion 64 having an extension of opening 84 though which adhesive 32 may be injected. Removable portion 64 may extend from mechanical housing 50 to allow attachment of a light delivery source such as light source 66 as shown in FIG. 12B.

In the example of FIG. 12B, light source 66 may be coupled to light guide 30 using removable portion 64. This is merely illustrative. If desired, light source 66 may be coupled directly to permanent portions of light guide 30.

As shown in FIG. 12B, following injection of adhesive 32 into assembly 10 through openings 84 and 80, light source 66 may be configured to generate (e.g., ultraviolet) light 42I and inject light 42I into light guide 30. Light guide 30 may be configured to guide light 42I into adhesive 32. Portions of light 42I such as light 42E may exit light guide 30 from an end such as end 36. Portions of light 42I such as light 42C may escape through light escape portions such as portion 38 of surface 37 of light guide 30. Upon reaching adhesive 32, light 42E and light 42C may be absorbed and distributed within adhesive 32 to cure adhesive 32.

Following curing of adhesive 32, light source 66 may be removed from light guide 30. In configurations in which light guide 30 is provided with a removable portion 64, removable portion 64 may be removed following curing of adhesive 32 with light from light source 66. As shown in FIG. 12C, assembly 10 may be provided with an embedded internal light guide structure such as light guide 30 embedded in cured adhesive 32. Cured adhesive 32 may substantially fill opening 84 and openings 80 in light guide 30.

Mechanical housing 50 may remain coupled to components such as component 52 to form a portion of a device housing such as housing 12, a frame such as frame 34 (see FIG. 2) or an assembly 10 including components 52 and 54 and light guide 30 may be removed from mechanical housing structure 50 an inserted into a device housing such as housing 12.

The configurations of FIGS. 11, 12A, 12B, and 12C in which light guide 30 has an opening 84 having a substantially cylindrical shape that runs along an extended dimension of light guide 30 (e.g., parallel to the y-axis of FIG. 11) are merely illustrative. Light guide structure 30 may have an opening 84 in edge 36 having any shape and extending into light guide 30.

Figure 13:
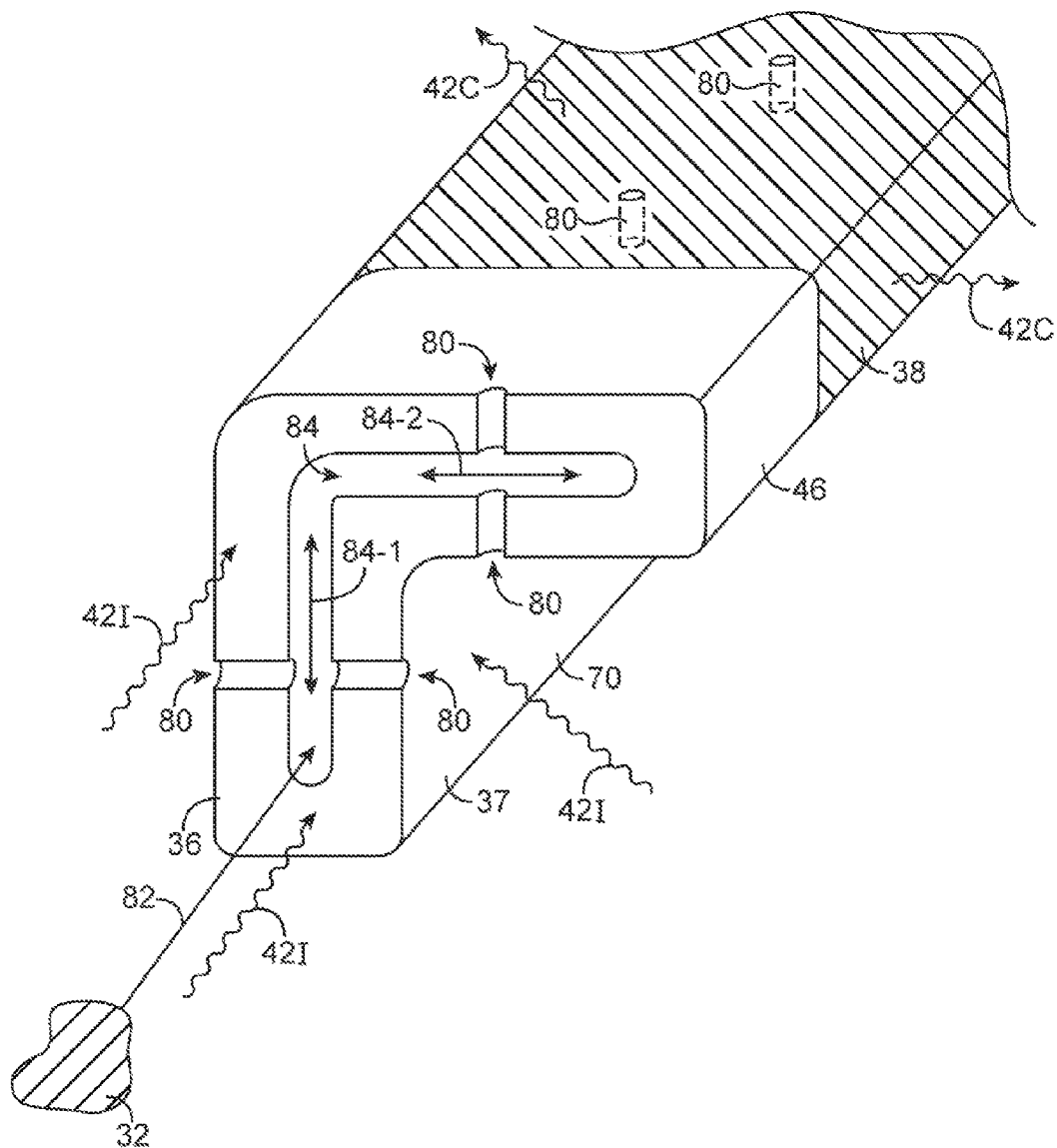
FIG. 13 is a perspective view of a light guide structure having openings, and a non-circular profile for adhesive delivery in accordance with an embodiment of the present invention.

As shown in FIG. 13, light guide 30 may have an edge 36 having an L-shaped profile and an exterior surface 37 having one or more planar surfaces 37P and one or more openings such as opening 84 an opening 80. In configurations in which edge 36 has an L-shaped profile, opening 80 may include first and second portions 84-1 and 84-2 that are substantially perpendicular. Planar surfaces 37P may include portions such as portion 70 for injecting incident light 42I and portions 38 from which light 42C may escape from light guide 30 into adhesive such as adhesive 32. Incident light 42I may be injected into edge 36, into portion 70 of planar surface 37P, or into both edge 36 and portion 70. Light guide 30 may include portions 46 that prevent light 42 from escaping.

Light guide 30 may include one or more openings such as openings 80 and opening 84. Opening 84 may include an opening in edge 36 of light guide 30 that runs along the length of light guide 30. Adhesive 32 may be injected into opening 84 of light guide 30 as indicated by arrow 82 during manufacturing of device 10. Openings 80 in outer surface 37 of light guide 30 may extend into contact with opening 84. Openings 80 may be configured to allow liquid adhesive 32 that is injected into opening 84 of light guide 30 to flow through openings 80 and into portions of an assembly such as assembly 10. In this way, adhesive may be formed around light guide 30 and among components of an assembly by injecting adhesive into opening 80 of a light guide 30 that forms a portion of the assembly.

Following injection of adhesive 32 through openings 84 and 80, light 42I that is injected into edge 36 and/or portion 70 may escape from one or more planar surfaces 37P of light guide 30 into adhesive 32. Providing light guide 30 with an L-shaped edge profile as in the example of FIG. 13 may allow light guide 30 to conform to corners or corner joints such as the junction of a device housing 12 and a display cover glass layer such as layer 14C. After curing of adhesive 32, light guide 30 having an L-shaped edge profile and openings 84 and 80 may be at least partially embedded in adhesive 32.

Figure 14:
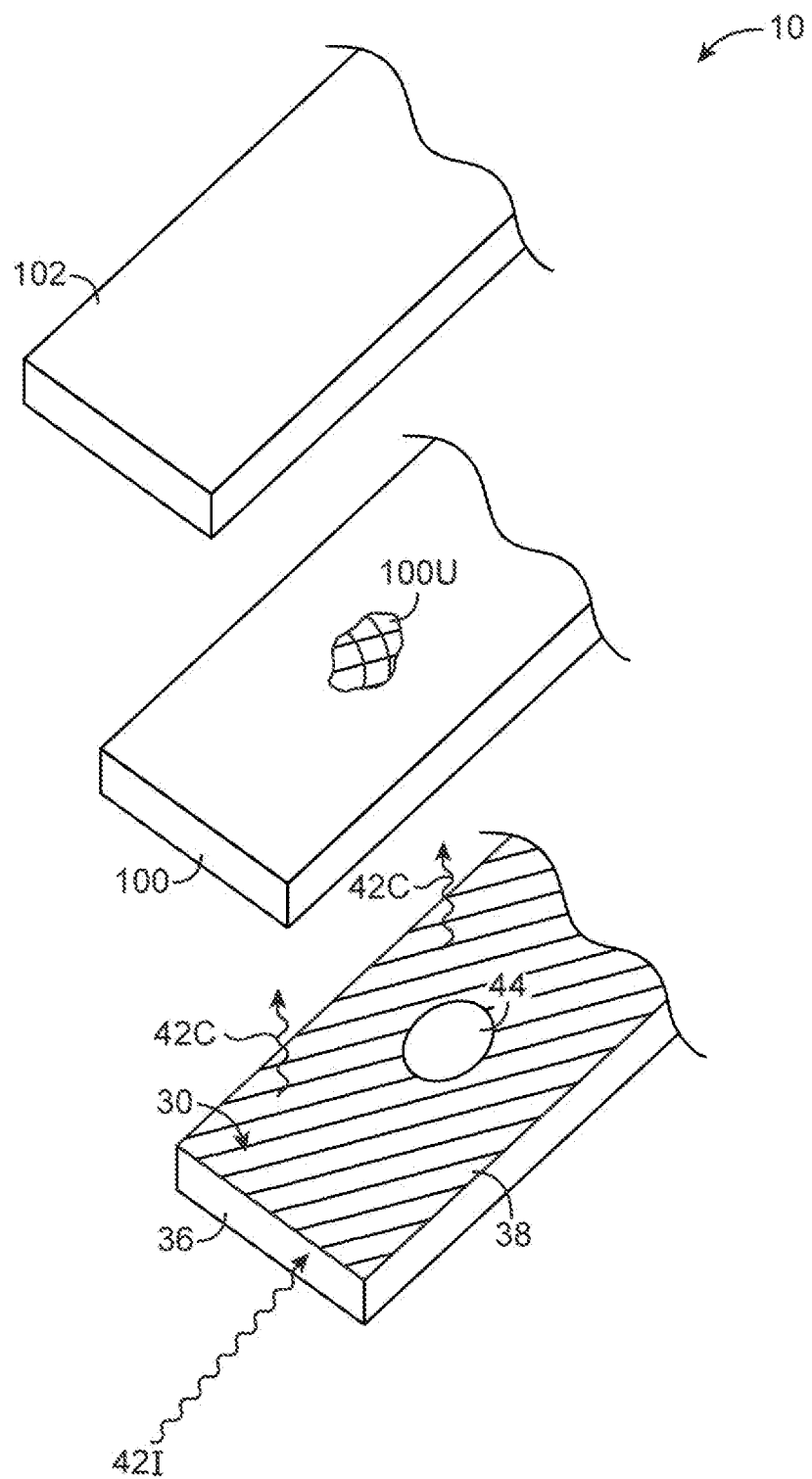
FIG. 14 is an exploded perspective view of an illustrative assembly that includes a light guide structure having a masked portion that prevents a pool of adhesive from being cured in accordance with an embodiment of the present invention.

Portions of light guide 30 may be provided with an opaque masking layer such as layer 44 configured to prevent portions such as portions 42C of light 42I from reaching portions of a light-curable material such as light-curable material 100 (e.g., a transparent light-curable resin or polymer, an opaque light-curable adhesive, etc.) as shown in FIG. 14. Masked portions 44 of light guide 30 may help leave one or more portions such as portion 100U uncured.

Light-curable material 100 may be interposed between a light guide such as light guide 30 and a cover layer such as cover layer 102. Cover layer 102 may be transparent or opaque. Cover layer 102 may be an interior or exterior member of device 10. Cover layer 102 may be formed from plastic, glass, ceramics, composites or other suitable materials. Uncured portions such as portion 100U of light-curable material 100 may have a refractive index that is different from cured portions of light-curable material 100. Uncured portions 100U may therefore be configured to form an internal lens for redirecting light within an assembly. For example, external light may pass through cover layer 102 and be redirected within device 10, internal light (e.g., light generated by display pixels of a display such as display 14 of FIG. 1) may be redirected outward of device 10 or within device 10 by uncured portion 100U.

Figure 15:
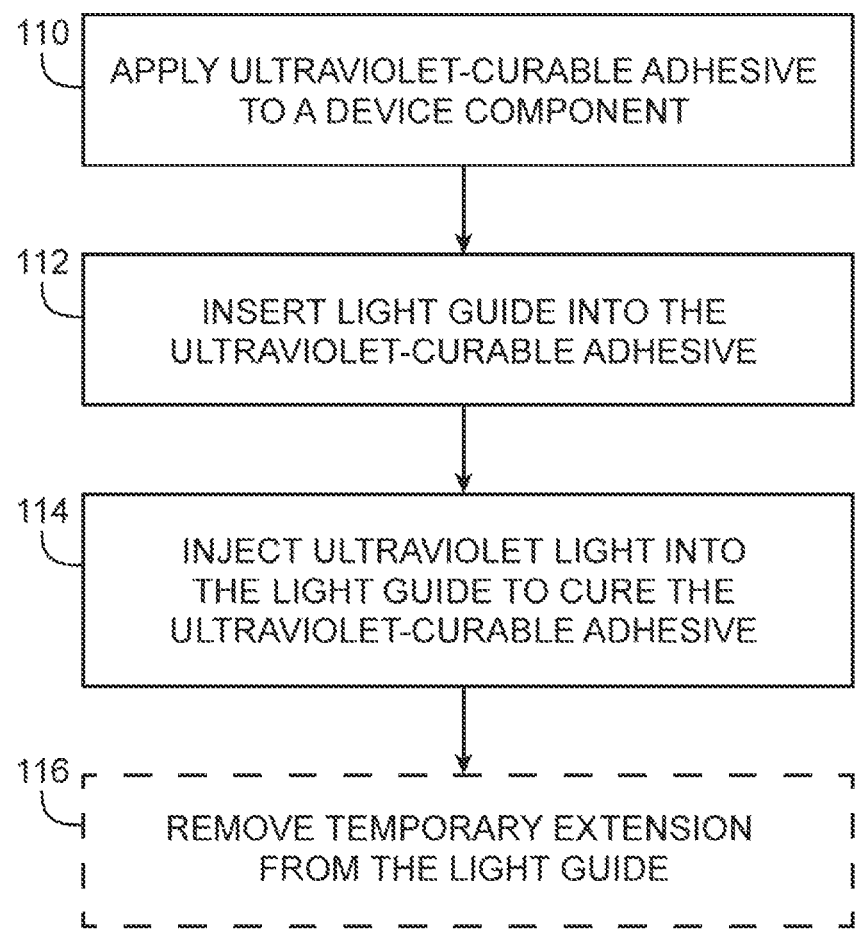
FIG. 15 is a flow chart of illustrative steps involved in using adhesive that is cured using embedded light guide structures to assemble structures in accordance with an embodiment of the present invention.

FIG. 15 shows illustrative steps that may be involved in forming assemblies (e.g., electronic devices, portions of electronic devices, or other groups of structures) by connecting structures with liquid adhesive and applying light to the adhesive from a light guide structure in the assembly. The light guide structure may, for example, be inserted at least partially into the adhesive after application of the adhesive to structures in the assembly.

At step 110, light-curable liquid adhesive (e.g., ultraviolet-curable adhesive) may be applied to one or more structures such as device components (e.g., printed circuit boards, housing structures and other structures for the assembly).

At step 112, a light guide structure (light guide) may be inserted into the ultraviolet-curable adhesive.

At step 114, ultraviolet light may be injected into the light guide structure. Portions of the injected ultraviolet light may escape from portions of the light guide into the ultraviolet-curable adhesive. The portions of the ultraviolet light that escape from the light guide may cure the ultraviolet-curable adhesive.

An ultraviolet light source may be coupled to the light guide structure for injection of the ultraviolet light into the light guide.

At step 116, a temporary extension to the light guide for light injection may optionally be removed from the light guide. However, this is merely illustrative. The light source may inject light directly into the light guide without a temporary extension for light injection.

Figure 16:
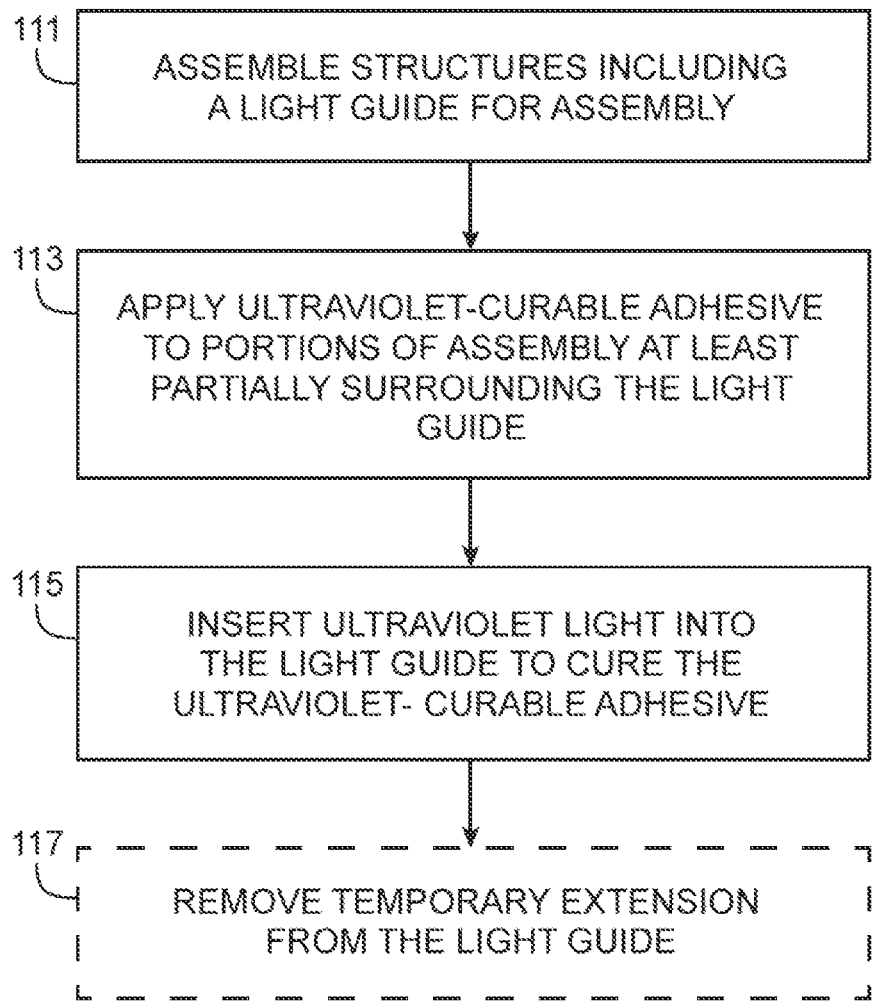
FIG. 16 is a flow chart of illustrative steps involved in using adhesive that is cured using embedded light guide structures in accordance with an embodiment of the present invention.

FIG. 16 shows illustrative steps that may be involved in forming assemblies (e.g., electronic devices, portions of electronic devices, or other groups of structures) by connecting structures with liquid adhesive and applying light to the adhesive from a light guide structure that is pre-positioned in the assembly.

At step 111, structures (e.g., a printed circuit board, a housing structure, a display cover layer, an interior frame, and other structures for the assembly) that include a light guide structure (light guide) may be assembled for an assembly. For example, the structures may be assembled in a temporary or permanent mechanical housing for assembly during manufacturing of a device.

At step 113, light-curable liquid adhesive (e.g., ultraviolet-curable adhesive) may be applied to portions of one or more structures of the assembly at least partially surrounding the light guide.

At step 115, ultraviolet light may be injected into the light guide structure. Portions of the injected ultraviolet light may escape from portions of the light guide into the ultraviolet-curable adhesive. The portions of the ultraviolet light that escape from the light guide may cure the ultraviolet-curable adhesive.

An ultraviolet light source may be coupled to the light guide structure for injection of the ultraviolet light into the light guide.

At step 117, a temporary extension to the light guide for light injection may optionally be removed from the light guide. However, this is merely illustrative. The light source may inject light directly into the light guide without a temporary extension for light injection.

Figure 17:
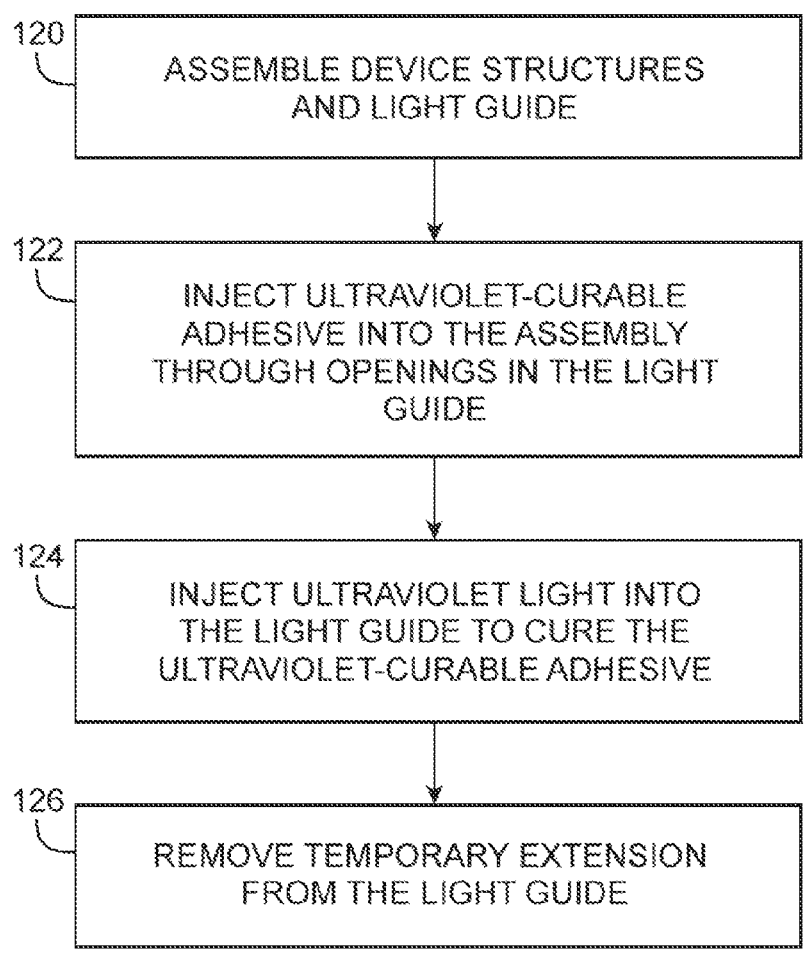
FIG. 17 is a flow chart of illustrative steps involved in using adhesive that is cured using embedded light guide structures with openings to assemble structures in accordance with an embodiment of the present invention.

FIG. 17 shows illustrative steps that may be involved in forming assemblies (e.g., electronic devices, portions of electronic devices, or other groups of structures) by connecting structures with liquid adhesive injected into the assemblies using openings in a light guide structure that is pre-positioned in the assembly.

At step 120, structures (e.g., a printed circuit board, a housing structure, a display cover layer, an interior frame, and other structures for the assembly) that include a light guide structure (light guide) having openings for injections of liquid light-curable adhesive may be assembled for an assembly. For example, the structures may be assembled in a temporary or permanent mechanical housing for assembly during manufacturing of a device.

At step 122, light-curable liquid adhesive (e.g., ultraviolet-curable adhesive) may be applied to portions of one or more structures of the assembly by injecting the ultraviolet-curable adhesive into an opening in the light guide. The light guide may be provided with additional openings that allow the ultraviolet-curable adhesive to flow from the light guide into the assembly at least partially surrounding the light guide.

At step 124, ultraviolet light may be injected into the light guide structure. Portions of the injected ultraviolet light may escape from portions of the light guide into the ultraviolet-curable adhesive. The portions of the ultraviolet light that escape from the light guide may cure the ultraviolet-curable adhesive.

An ultraviolet light source may be coupled to the light guide structure for injection of the ultraviolet light into the light guide.

At step 126, a temporary extension to the light guide for light and adhesive injection may optionally be removed from the light guide. However, this is merely illustrative. The light and light-curable liquid adhesive may be injected directly into the light guide structure without a temporary extension.

The foregoing is merely illustrative of the principles of this invention and various modifications can be made by those skilled in the art without departing from the scope and spirit of the invention. The foregoing embodiments may be implemented individually or in any combination.

What is claimed is:

1. An electronic device, comprising:
    a housing;
    a display layer;
    an embedded light guide structure; and
    ultraviolet-light-cured adhesive that attaches the housing to the display layer, wherein the embedded light guide structure is at least partially embedded in the ultraviolet-light-cured adhesive.

2. The electronic device defined in claim 1, further comprising a flexible light-emitting diode array attached to the display layer.

3. The electronic device defined in claim 1 wherein the embedded light guide structure comprises a rigid support member and light guide material formed around the rigid support member.

4. The electronic device defined in claim 3 wherein the rigid support member comprises a cylindrical rigid support member.

5. The electronic device defined in claim 3 wherein the rigid support member comprises first and second portions and wherein the first portion is perpendicular to the second portion.

6. The electronic device defined in claim 1 wherein the embedded light guide structure comprises first and second portions and wherein the first portion is formed from a first material having a first refractive index and the second portion is formed from a second material having a second refractive index that is different from the first refractive index.

7. The electronic device defined in claim 1 wherein the embedded light guide structure comprises an external surface having first and second portions and wherein the first portion has a first surface roughness and the second portion has a second surface roughness that is greater than the first surface roughness.

8. The electronic device defined in claim 1, further comprising an internal lens, wherein the embedded light guide structure has an external surface that is partially covered by an opaque masking layer, wherein the internal lens is formed from an uncured portion of the ultraviolet-light-cured adhesive, and wherein the opaque masking layer is formed adjacent to the uncured portion of the ultraviolet-light-cured adhesive.

9. The electronic device defined in claim 1 wherein the display layer and the housing are joined to form a corner, wherein the ultraviolet-light-cured adhesive is located in the corner, and wherein the embedded light guide structure has a bend in the corner.

10. An electronic device, comprising:
    a housing;
    a display layer having first and second opposing edges;
    ultraviolet-light-cured adhesive that attaches the housing to the display layer; and
    first and second light guides adjacent to the ultraviolet-light cured adhesive, wherein the first light guide extends parallel to the first edge of the display layer and wherein the second light guide extends parallel to the second edge of the display layer.

11. The electronic device defined in claim 10 wherein the first and second light guides are at least partially embedded in the ultraviolet-light-cured adhesive.

12. The electronic defined in claim 10 wherein the first and second light guides each have an elongated shape with a curved surface.

13. The electronic device defined in claim 10 wherein at least one of the first and second light guides has a bend.

14. The electronic device defined in clam 13 wherein the display layer and the housing form a corner and wherein the bend is located in the corner.

15. The electronic device defined in claim 10 wherein at least one of the first and second light guides comprises a rigid support member and light guide material formed around the rigid support member.

16. The electronic device defined in claim 15 wherein the rigid support member comprises a cylindrical rigid support member.

17. The electronic device defined in claim 10 wherein the at least one of the first and second light guides comprises first and second portions and wherein the first portion is formed from a first material having a first refractive index and the second portion is formed from a second material having a second refractive index that is different from the first refractive index.

18. The electronic device defined in claim 10 wherein at least one of the first and second light guides comprises an external surface having first and second portions and wherein the first portion has a first surface roughness and the second portion has a second surface roughness that is greater than the first surface roughness.

* * * * *